(12) United States Patent
Ding et al.

(10) Patent No.: US 10,203,820 B2
(45) Date of Patent: Feb. 12, 2019

(54) SELF-CAPACITANCE TOUCH LIQUID CRYSTAL GRATING, MANUFACTURING METHOD THEREOF, DRIVING METHOD THEREOF, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Changfeng Li, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 156 days.

(21) Appl. No.: 15/079,262

(22) Filed: Mar. 24, 2016

(65) Prior Publication Data
US 2016/0313617 A1   Oct. 27, 2016

(30) Foreign Application Priority Data
Apr. 24, 2015   (CN) .......................... 2015 1 0202650

(51) Int. Cl.
*G02F 1/133*   (2006.01)
*G06F 3/044*   (2006.01)
*G02F 1/1333*   (2006.01)

(52) U.S. Cl.
CPC .......... *G06F 3/044* (2013.01); *G02F 1/13338* (2013.01); *G06F 2203/04103* (2013.01)

(58) Field of Classification Search
CPC ........... G02F 1/134336; G02F 1/13338; G02F 1/13439; G06F 3/044; G06F 2203/04103
(Continued)

(56) References Cited

U.S. PATENT DOCUMENTS

2013/0147730 A1*  6/2013  Chien ................... G06F 3/0412
                                                      345/173
2014/0211104 A1*  7/2014  Yang ....................... G06F 3/041
                                                       349/12

FOREIGN PATENT DOCUMENTS

CN         202351566 U       7/2012
CN         203241674 U      10/2013
(Continued)

OTHER PUBLICATIONS

First Office Action dated Apr. 6, 2017 corresponding to Chinese application No. 201510202650.9.

*Primary Examiner* — Charles Chang
(74) *Attorney, Agent, or Firm* — Nath, Goldberg & Meyer; Joshua B. Goldberg

(57) ABSTRACT

Embodiments of the invention provide a self-capacitance touch liquid crystal grating, a manufacturing method thereof, a driving method thereof, a self-capacitance touch liquid crystal 3D display panel, and a self-capacitance touch liquid crystal 3D display device. In the grating provided by embodiments of the present invention, as orthographic projections of strip-shaped electrodes on a sensing electrode layer are respectively located in row spacing areas or column spacing areas formed through sensing electrodes arranged in a matrix form, the sensing electrode-to-earth capacitance is located between a surface-shaped electrode and the sensing electrodes, and the strip-shaped electrode
(Continued)

will not cause the sensing electrode-to-earth capacitance to be increased. Therefore, RC loading of the sensing electrodes can be largely reduced, and also the interference between the sensing electrodes and the grating can be avoided, so that touch operations will not interfere with operations of the grating.

20 Claims, 3 Drawing Sheets

(58) Field of Classification Search
USPC .......................................................... 349/12
See application file for complete search history.

(56) References Cited

FOREIGN PATENT DOCUMENTS

| | | |
|---|---|---|
| CN | 103698926 A | 4/2014 |
| WO | 2014000366 A1 | 1/2014 |

* cited by examiner

SELF-CAPACITANCE TOUCH LIQUID CRYSTAL GRATING, MANUFACTURING METHOD THEREOF, DRIVING METHOD THEREOF, DISPLAY PANEL AND DISPLAY DEVICE

FIELD OF THE INVENTION

The present invention relates to the field of touch technology, and particularly relates to a self-capacitance touch liquid crystal grating, a manufacturing method thereof, a driving method thereof, a display panel, and a display device.

BACKGROUND OF THE INVENTION

21st century is an era of information revolution, and the development of communication technology leads this information revolution. The pursuit of mobile communication products by people is changed from black-and-white displayed mobile communication product in the early days to color displayed mobile communication product, and at present, to touch mobile communication product. As the big data time is coming, 3D mobile communication product attracts people's attentions, and becomes future trend of development in the field of communication. However, a technique in which an in-cell touch is implemented in a state of 3D display is rarely known by people.

In the prior art, a bottleneck of implementing the in-cell touch in the state of 3D display is that a resistance-capacitance loading (RC loading) of a sensing electrode is increased by a surface-shaped electrode and a strip-shaped electrode of a 3D grating. Meanwhile, a voltage signal on the sensing electrode interferes with deflection of liquid crystal in the 3D grating. Hence, how to prevent the 3D grating and the sensing electrode from interfering with each other becomes a technical problem in the art, which needs to be solved urgently.

SUMMARY OF THE INVENTION

In view of above problems in the prior art, embodiments of the present invention provide a self-capacitance touch liquid crystal grating, a manufacturing method thereof, a driving method thereof, a self-capacitance touch liquid crystal 3D display panel, and a self-capacitance touch liquid crystal 3D display device.

An embodiment of the present invention provides a self-capacitance touch liquid crystal grating, which includes a first base substrate, a second base substrate and a liquid crystal layer that is filled between the first base substrate and the second base substrate, wherein
   the first base substrate includes a first substrate, and a sensing electrode layer and a plurality of strip-shaped electrodes arranged on a side of the first substrate facing the liquid crystal layer, the sensing electrode layer being arranged to be insulated from the plurality of strip-shaped electrodes, the sensing electrode layer including a plurality of sensing electrodes arranged in a matrix form, the plurality of strip-shaped electrodes being arranged in parallel and spaced, orthographic projections of the plurality of strip-shaped electrodes on the sensing electrode layer being respectively located in a plurality of row spacing areas or a plurality of column spacing areas formed through the plurality of sensing electrodes arranged in the matrix form;
   the second base substrate includes a second substrate and a surface-shaped electrode arranged on a side of the second substrate facing the liquid crystal layer, an electric field generated between the surface-shaped electrode and the strip-shaped electrode being capable of controlling deflections of liquid crystal molecules in the liquid crystal layer.

The first base substrate may further include connecting lines connected with the plurality of sensing electrodes, the connecting lines being arranged in a conductive layer, and being used for transmitting driving signals and detection signals to the plurality of sensing electrodes.

The connecting lines may be made from indium tin oxide, indium zinc oxide or a nano-silver material.

The connecting lines may be connected with the plurality of sensing electrodes through via holes.

The connecting lines may be arranged in one conductive layer.

The connecting lines may be arranged in two different conductive layers that are respectively located at both sides of the sensing electrode layer.

The sensing electrode layer may be arranged between the plurality of strip-shaped electrodes and the first substrate.

The connecting lines may be arranged between the plurality of strip-shaped electrodes and the sensing electrode layer.

An embodiment of the present invention further provides a manufacturing method of the above-described self-capacitance touch liquid crystal grating, including steps of:
   manufacturing a first base substrate, comprising:
      forming a sensing electrode layer on a first substrate by a patterning process, the sensing electrode layer including a plurality of sensing electrodes arranged in a matrix form; forming a first insulation layer on the first substrate formed with the plurality of sensing electrodes by a patterning process, and forming a plurality of via holes at positions on the first insulation layer respectively corresponding to the plurality of sensing electrodes; forming connecting lines on the first substrate formed with the first insulation layer by a patterning process, and connecting the connecting lines with the plurality of sensing electrodes through the plurality of via holes; forming a second insulation layer on the first substrate formed with the connecting lines; and forming a plurality of strip-shaped electrodes on the first substrate formed with the second insulation layer by a patterning process;
   manufacturing a second base substrate, comprising:
      forming a surface-shaped electrode on a second substrate; and
   manufacturing a self-capacitance touch liquid crystal grating, comprising:
      assembling the first base substrate and the second base substrate and injecting liquid crystals therebetween, so as to form the self-capacitance touch liquid crystal grating.

An embodiment of the present invention further provides a driving method for the above self-capacitance touch liquid crystal grating, including a step of alternately driving the sensing electrodes, the surface-shaped electrode and the strip-shaped electrodes during a display phase and a touch phase, wherein:
   in the display phase: inputting a first surface-shaped electrode driving voltage signal to the sensing electrodes and the surface-shaped electrode and inputting a first grating driving voltage signal to the strip-shaped electrodes, such that an electric field capable of controlling the liquid crystal grating is generated between the surface-shaped electrode and the strip-shaped electrodes; and in the touch phase: inputting a first sensing electrode driving voltage signal to the sensing electrodes and the surface-shaped electrode and inputting a second grating driving voltage signal to the strip-shaped electrodes; wherein a voltage difference between the second grating driving voltage signal and the first sensing electrode driving voltage signal in the touch phase is equal to a voltage difference between the first grating driving voltage signal and the first surface-shaped electrode driving voltage signal in the display phase.

For example, in the driving method, in the touch phase:
the first sensing electrode driving voltage signal is a first square-wave pulsed voltage signal with the first surface-shaped electrode driving voltage as a low level and a sum of the first surface-shaped electrode driving voltage and a touch voltage as a high level; and
the second grating driving voltage signal is a second square-wave pulsed voltage signal with the first grating driving voltage as a low level and a sum of the first grating driving voltage and a touch voltage as a high level.

An embodiment of the present invention further provides a self-capacitance touch liquid crystal 3D display panel, including a liquid crystal display substrate and the above-described self-capacitance touch liquid crystal grating attached with the liquid crystal display substrate.

An embodiment of the present invention further provides a self-capacitance touch liquid crystal 3D display device, including the above-described self-capacitance touch liquid crystal 3D display panel.

In the self-capacitance touch liquid crystal grating provided by the present invention, as the orthographic projections of the plurality of strip-shaped electrodes on the sensing electrode layer are respectively located in the plurality of row spacing areas or the plurality of column spacing areas formed through the plurality of sensing electrodes arranged in the matrix form, the sensing electrode-to-earth capacitance is located between the surface-shaped electrode and the sensing electrodes, and the strip-shaped electrode will not cause the sensing electrode-to-earth capacitance to be increased. Therefore, the RC loading of the sensing electrodes can be largely reduced, and also the interference between the sensing electrodes and the grating can be avoided, so that touch operations will not interfere with operations of the grating.

Figure 1:
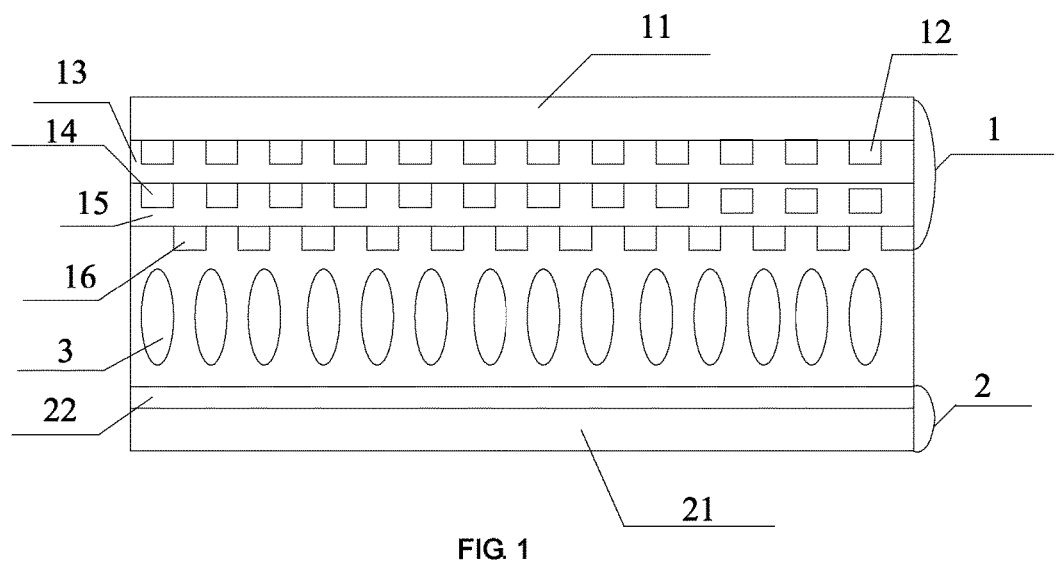
FIG. 1 is a sectional diagram of a self-capacitance touch liquid crystal grating in Embodiment 1 of the present invention.

Numeral references in the drawings: 1. first base substrate; 11. first substrate; 12. sensing electrode; 13. first insulation layer; 14. connecting line; 15. second insulation layer; 16. strip-shaped electrode; 2. second base substrate; 21, second substrate; 22. surface-shaped electrode; and 3. liquid crystal layer.

DETAILED DESCRIPTION OF THE EMBODIMENTS

To make those skilled in the art better understand the technical solutions of the present invention, embodiments of the present invention will be further described in details below in conjunction with the accompanying drawings and specific implementations.

Embodiment 1

The present embodiment provides a self-capacitance touch liquid crystal grating, as shown in FIG. 1, it includes a first base substrate 1, a second base substrate 2 and a liquid crystal layer 3 that is filled between the first base substrate 1 and the second base substrate 2. The first base substrate 1 includes a first substrate 11, and a sensing electrode layer and a plurality of strip-shaped electrodes 16 arranged on a side of the first substrate 11 facing the liquid crystal layer 3, the sensing electrode layer being arranged to be insulated from the plurality of strip-shaped electrodes 16. The sensing electrode layer includes a plurality of sensing electrodes 12 arranged in a matrix form. The plurality of strip-shaped electrodes 16 are arranged in parallel and spaced. Orthographic projections of the plurality of strip-shaped electrodes 16 on the sensing electrode layer are respectively located in a plurality of row spacing areas or a plurality of column spacing areas formed through the plurality of sensing electrodes 12 arranged in the matrix form. The second base substrate 2 includes a second substrate 21 and a surface-shaped electrode 22 arranged on a side of the second substrate 21 facing the liquid crystal layer 3, an electric field generated between the surface-shaped electrode 22 and the strip-shaped electrodes 16 being capable of controlling deflections of liquid crystal molecules in the liquid crystal layer 3.

In the self-capacitance touch liquid crystal grating provided by the present embodiment, as the orthographic projections of the plurality of strip-shaped electrodes 16 on the sensing electrode layer are respectively located in the plurality of row spacing areas or the plurality of column spacing areas formed through the plurality of sensing electrodes 12 arranged in the matrix form, the sensing electrode-to-earth capacitance is located between the surface-shaped electrode 22 and the sensing electrode 12, and the strip-shaped electrodes 16 will not cause the sensing electrode-to-earth capacitance to be increased. Therefore, the RC loading of the sensing electrodes 12 can be largely reduced, and also the interference between the sensing electrodes and the grating can be avoided, so that touch operations will not interfere with operations of the grating.

For example, the first base substrate 1 may further include connecting lines 14 connected with the plurality of sensing electrodes 12, the connecting lines 14 being arranged in a conductive layer, and being used for transmitting driving signals and detection signals to the plurality of sensing electrodes 12.

For example, the connecting line 14 may be made from indium tin oxide, indium zinc oxide or a nano-silver material, so as to lower a resistance of the connecting line 14. It should be understood that, the resistance of the connecting line 14 can also be lowered by making the conductive layer in which the connecting lines 14 are located thicker.

For example, the connecting lines 14 may be connected with the plurality of sensing electrodes 12 through via holes. As shown in FIG. 1, the connecting lines 14 may be connected with the plurality of sensing electrodes 12 through via holes provided in a first insulation layer 13. The present embodiment is introduced by taking the connecting lines 14 being arranged in one conductive layer as an example, however, the connecting lines 14 may also be arranged in two different conductive layers that are respectively located at both sides of the sensing electrode layer, so that the connecting lines 14 can be disposed more conveniently.

Specifically, the sensing electrode layer may be provided between the plurality of strip-shaped electrodes 16 and the first substrate 11.

For example, the connecting lines 14 may be provided between the plurality of strip-shaped electrodes 16 and the sensing electrode layer. Obviously, the conductive layer in which the connecting lines 14 are located is arranged to be insulated from the plurality of strip-shaped electrodes 16.

Embodiment 2

As shown in FIGS. 1-7, the present embodiment provides a manufacturing method of the self-capacitance touch liquid crystal grating of Embodiment 1, which includes the following steps S1 to S3.

At step S1, the first base substrate 1 is manufactured.

The step S1 specifically includes the following steps S11 to S15.

Figure 2:
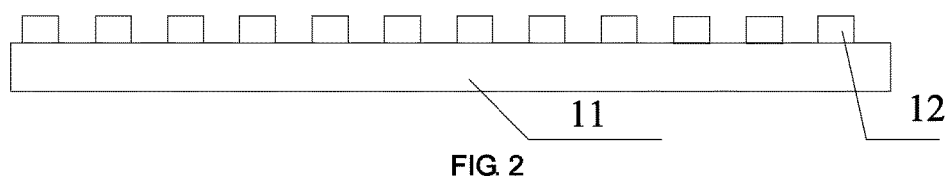
FIG. 2 is a sectional diagram of a first substrate with sensing electrodes formed thereon in Embodiment 2 of the present invention.

At step S11, as shown in FIG. 2, the sensing electrode layer is formed on the first substrate 11 by a patterning process, and the sensing electrode layer includes a plurality of sensing electrodes 12 arranged in a matrix form. In this embodiment, the sensing electrode 12 is a self-capacitance type sensing electrode, so that it will be sufficient if the plurality of sensing electrodes 12 are formed in the matrix form.

Figure 3:
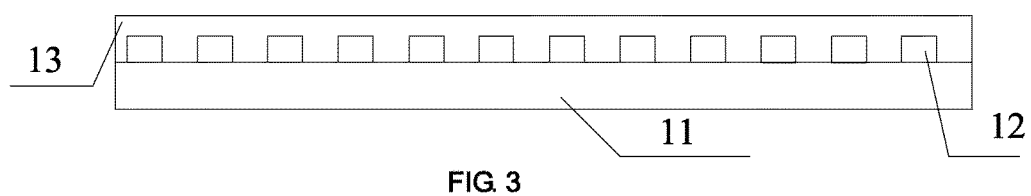
FIG. 3 is a sectional diagram of the first substrate of FIG. 2 with a first insulation layer formed thereon.

At step S12, as shown in FIG. 3, by a patterning process, the first insulation layer 13 is formed on the first substrate 11 formed with the plurality of sensing electrodes 12, and a plurality of via holes (not shown in the Figure) are formed at positions on the first insulation layer 13 corresponding to the plurality of sensing electrodes 12 respectively. In this embodiment, it will be sufficient if the plurality of via holes and the plurality of sensing electrodes 12 are respectively corresponding to each other on a one-to-one basis.

Figure 4:
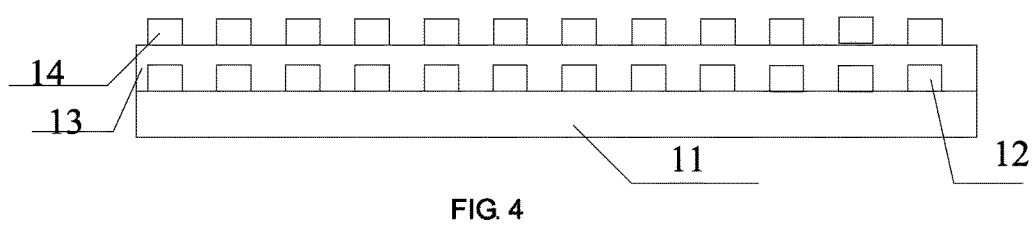
FIG. 4 is a sectional diagram of the first substrate of FIG. 3 with connecting lines formed thereon.

At step S13, as shown in FIG. 4, the connecting lines 14 are formed on the first substrate 11 formed with the first insulation layer 13 by a patterning process, and the connecting lines 14 are connected with the plurality of sensing electrodes 12 through the plurality of via holes, such that the connecting lines 14 are connected with the plurality of sensing electrodes 12 and extended from a touch area before connecting with a driver IC. The connecting lines 14 are used for transmitting driving signals and detection signals to the plurality of sensing electrodes 12.

Figure 5:
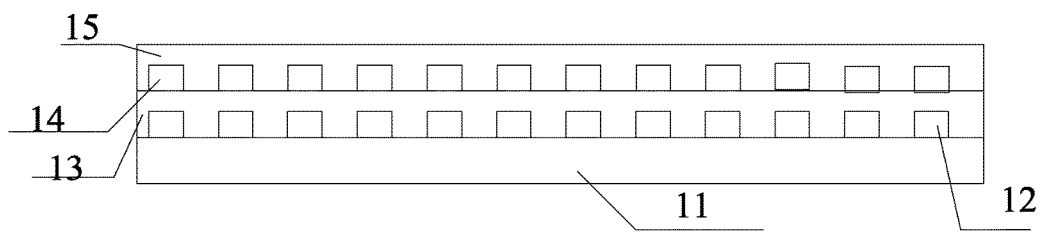
FIG. 5 is a sectional diagram of the first substrate of FIG. 4 with a second insulation layer formed thereon.

At step S14, as shown in FIG. 5, the second insulation layer 15 is formed on the first substrate 11 formed with the connecting lines 14.

Figure 6:
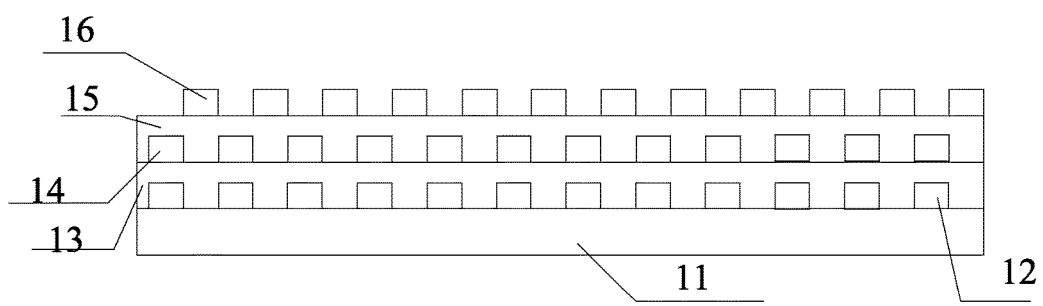
FIG. 6 is a sectional diagram of the first substrate of FIG. 5 with strip-shaped electrodes formed thereon.

At step S15, as shown in FIG. 6, the plurality of strip-shaped electrodes 16 are formed on the first substrate 11 formed with the second insulation layer 15 by a patterning process. In this case, orthographic projections of the plurality of strip-shaped electrodes 16 on the sensing electrode layer are respectively located in a plurality of row spacing areas or a plurality of column spacing areas formed through the plurality of sensing electrodes 12 arranged in the matrix form. In other words, orthographic projections of the plurality of sensing electrodes 12 on the first substrate 11 and orthographic projections of the plurality of strip-shaped electrodes 16 on the first substrate 11 are not overlapped with each other.

The above patterning processes are common in the prior art, and will not be described in details herein.

Figure 7:
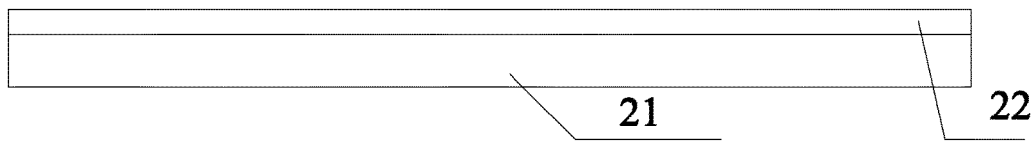
FIG. 7 is a sectional diagram of a second substrate with a surface-shaped electrode formed thereon in Embodiment 2 of the present invention.

At step S2, the second base substrate 2 is manufactured. As shown in FIG. 7, the surface-shaped electrode 22 is formed on the second substrate 21. In this embodiment, the surface-shaped electrode 22 is formed by depositing on the second substrate 21 for example a whole layer of metal film.

At step S3, the self-capacitance touch liquid crystal grating is manufactured. As shown in FIG. 1, the first base substrate 1 and the second base substrate 2 are assembled and injected therebetween with liquid crystals, so as to form the self-capacitance touch liquid crystal grating. The assembling process and liquid crystal injection process are common in the prior art, and will not be described in details herein.

Embodiment 3

Figure 8:
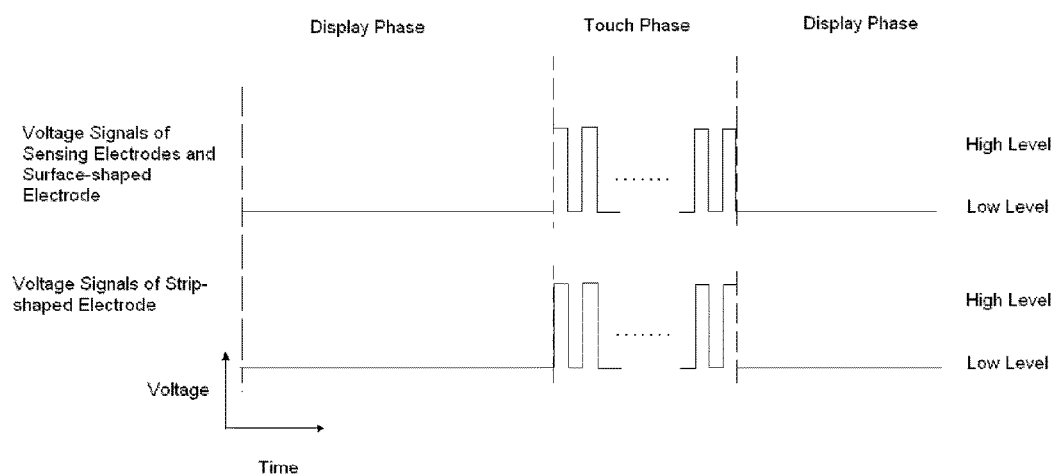
FIG. 8 is a timing sequence diagram of voltage control for a self-capacitance touch liquid crystal grating in Embodiment 3 of the present invention.

As shown in FIG. 8, the present embodiment provides a driving method for the self-capacitance touch liquid crystal grating of Embodiment 1, including a step of alternately driving the sensing electrodes 12, the surface-shaped electrode 22 and the strip-shaped electrodes 16 during a display phase and a touch phase.

In the display phase: a first surface-shaped electrode driving voltage signal is input to the sensing electrodes 12 and the surface-shaped electrode 22, and a first grating driving voltage signal is input to the strip-shaped electrodes 16, such that an electric field capable of controlling the liquid crystal grating is generated between the surface-shaped electrode 22 and the strip-shaped electrodes 16, whereas there is no electric field between the sensing electrodes 12 and the surface-shaped electrode 22. Therefore, the control on the deflections of the liquid crystals by the electric field generated between the strip-shaped electrodes 16 and the surface-shaped electrode 22 will not be interfered, and the interference between the sensing electrodes and the grating can be avoided, which in turn avoids the interference on the operations of the grating by touch operations.

In the touch phase: a first sensing electrode driving voltage signal is input to the sensing electrodes 12 and the surface-shaped electrode 22, and a second grating driving voltage signal is input to the strip-shaped electrodes 16. Wherein, voltage difference between the second grating driving voltage signal and the first sensing electrode driving voltage signal in the touch phase is equal to voltage difference between the first grating driving voltage signal and the first surface-shaped electrode driving voltage signal in the display phase, such that the RC loading of the sensing electrodes 12 will not be increased by the surface-shaped electrode 22 in the touch phase.

In addition, as voltage difference between the surface-shaped electrode 22 and the strip-shaped electrode 16 (i.e., the voltage difference between the second grating driving voltage signal and the first sensing electrode driving voltage signal) in the touch phase maintains the same as voltage difference between the surface-shaped electrode 22 and the strip-shaped electrode 16 (i.e., the voltage difference between the first grating driving voltage signal and the first surface-shaped electrode driving voltage signal) in the display phase, it can be ensured that the sensing electrodes will not affect the operations of the grating in the touch phase.

Meanwhile, as the orthographic projections of the plurality of strip-shaped electrodes 16 on the sensing electrode layer are respectively located in the plurality of row spacing areas or the plurality of column spacing areas formed through the plurality of sensing electrodes 12 arranged in the matrix form, the RC loading of the sensing electrodes 12 will not be increased by the strip-shaped electrodes 16 as well in the touch phase.

Specifically, as shown in FIG. 8, in the touch phase: the first sensing electrode driving voltage signal is a first square-wave pulsed voltage signal with the first surface-shaped electrode driving voltage as a low level and a sum of the first surface-shaped electrode driving voltage and a touch voltage as a high level; and the second grating driving voltage signal is a second square-wave pulsed voltage signal with the first grating driving voltage as a low level and a sum of the first grating driving voltage and a touch voltage as a high level.

Embodiment 4

The present embodiment provides a self-capacitance touch liquid crystal 3D display panel, which includes a liquid crystal display substrate and the self-capacitance touch liquid crystal grating of Embodiment 1 attached therewith.

Embodiment 5

The present embodiment provides a self-capacitance touch liquid crystal 3D display device, which includes the self-capacitance touch liquid crystal 3D display panel of Embodiment 4.

It can be understood that the foregoing implementations are merely exemplary embodiments adopted for the purpose of explaining the principle of the present invention, but the present invention is not limited thereto. Various modifications and improvements can be made by those skilled in the art without departing from the spirit and essence of the present invention. These modifications and improvements shall also fall within the protection scope of the present invention.

What is claimed is:

1. A self-capacitance touch liquid crystal grating, which includes a first base substrate, a second base substrate and a liquid crystal layer that is filled between the first base substrate and the second base substrate, wherein the first base substrate includes a first substrate, and a sensing electrode layer and a plurality of strip-shaped electrodes arranged on a side of the first substrate facing the liquid crystal layer, the sensing electrode layer being arranged to be insulated from the plurality of strip-shaped electrodes, the sensing electrode layer including a plurality of sensing electrodes arranged in a matrix form, the plurality of strip-shaped electrodes being arranged in parallel and spaced, orthographic projections of the plurality of strip-shaped electrodes on the sensing electrode layer being respectively located in a plurality of row spacing areas or a plurality of column spacing areas formed through the plurality of sensing electrodes arranged in the matrix form, and the orthographic projections of the plurality of strip-shaped electrodes on the first base substrate do not overlap with orthographic projections of the plurality of sensing electrodes on the first base substrate;

the second base substrate includes a second substrate and a surface-shaped electrode arranged on a side of the second substrate facing the liquid crystal layer, an electric field generated between the surface-shaped electrode and the strip-shaped electrodes being capable of controlling deflections of liquid crystal molecules in the liquid crystal layer, wherein the surface-shaped electrode is configured as a continuous integral electrode layer.

2. The self-capacitance touch liquid crystal grating according to claim 1, wherein the first base substrate further includes connecting lines connected with the plurality of sensing electrodes, the connecting lines being arranged in a conductive layer, and being used for transmitting driving signals and detection signals to the plurality of sensing electrodes.

3. The self-capacitance touch liquid crystal grating according to claim 2, wherein the connecting lines are made from indium tin oxide, indium zinc oxide or a nano-silver material.

4. The self-capacitance touch liquid crystal grating according to claim 2, wherein the connecting lines are connected with the plurality of sensing electrodes through via holes.

5. The self-capacitance touch liquid crystal grating according to claim 2, wherein the connecting lines are arranged in one conductive layer.

6. The self-capacitance touch liquid crystal grating according to claim 2, wherein the connecting lines are arranged in two different conductive layers that are respectively located at both sides of the sensing electrode layer.

7. The self-capacitance touch liquid crystal grating according to claim 2, wherein the connecting lines are arranged between the plurality of strip-shaped electrodes and the sensing electrode layer.

8. The self-capacitance touch liquid crystal grating according to claim 1, wherein the sensing electrode layer is arranged between the plurality of strip-shaped electrodes and the first substrate.

9. A manufacturing method of the self-capacitance touch liquid crystal grating of claim 1, including steps of:

manufacturing a first base substrate, comprising:

forming a sensing electrode layer on a first substrate by a patterning process, the sensing electrode layer including a plurality of sensing electrodes arranged in a matrix form; forming a first insulation layer on the first substrate formed with the plurality of sensing electrodes by a patterning process, and forming a plurality of via holes at positions on the first insulation layer respectively corresponding to the plurality of sensing electrodes; forming connecting lines on the first substrate formed with the first insulation layer by a patterning process, and connecting the connecting lines with the plurality of sensing electrodes through the plurality of via holes; forming a second insulation layer on the first substrate formed with the connecting lines; and forming a plurality of strip-shaped electrodes on the first substrate formed with the second insulation layer by a patterning process;

manufacturing a second base substrate, comprising:
forming a surface-shaped electrode on a second substrate; and manufacturing a self-capacitance touch liquid crystal grating, comprising:
assembling the first base substrate and the second base substrate and injecting liquid crystals therebetween, so as to form the self-capacitance touch liquid crystal grating.

10. A driving method for the self-capacitance touch liquid crystal grating of claim 1, including a step of alternately driving the sensing electrodes, the surface-shaped electrode and the strip-shaped electrodes during a display phase and a touch phase, wherein:

in the display phase: inputting a first surface-shaped electrode driving voltage signal to the sensing electrodes and the surface-shaped electrode and inputting a first grating driving voltage signal to the strip-shaped electrodes, such that an electric field capable of controlling the liquid crystal grating is generated between the surface-shaped electrode and the strip-shaped electrodes; and in the touch phase: inputting a first sensing electrode driving voltage signal to the sensing electrodes and the surface-shaped electrode and inputting a second grating driving voltage signal to the strip-shaped electrodes; wherein a voltage difference between the second grating driving voltage signal and the first sensing electrode driving voltage signal in the touch phase is equal to a voltage difference between the first grating driving voltage signal and the first surface-shaped electrode driving voltage signal in the display phase.

11. The driving method for the self-capacitance touch liquid crystal grating according to claim 10, wherein
in the touch phase:
the first sensing electrode driving voltage signal is a first square-wave pulsed voltage signal with the first surface-shaped electrode driving voltage as a low level and a sum of the first surface-shaped electrode driving voltage and a touch voltage as a high level; and
the second grating driving voltage signal is a second square-wave pulsed voltage signal with the first grating driving voltage as a low level and a sum of the first grating driving voltage and a touch voltage as a high level.

12. A self-capacitance touch liquid crystal 3D display panel, including a liquid crystal display substrate and a self-capacitance touch liquid crystal grating attached with the liquid crystal display substrate, the self-capacitance touch liquid crystal grating including a first base substrate, a second base substrate and a liquid crystal layer that is filled between the first base substrate and the second base substrate, wherein
the first base substrate includes a first substrate, and a sensing electrode layer and a plurality of strip-shaped electrodes arranged on a side of the first substrate facing the liquid crystal layer, the sensing electrode layer being arranged to be insulated from the plurality of strip-shaped electrodes, the sensing electrode layer including a plurality of sensing electrodes arranged in a matrix form, the plurality of strip-shaped electrodes being arranged in parallel and spaced, orthographic projections of the plurality of strip-shaped electrodes on the sensing electrode layer being respectively located in a plurality of row spacing areas or a plurality of column spacing areas formed through the plurality of sensing electrodes arranged in the matrix form, and the orthographic projections of the plurality of strip-shaped electrodes on the first base substrate do not overlap with orthographic projections of the plurality of sensing electrodes on the first base substrate;
the second base substrate includes a second substrate and a surface-shaped electrode arranged on a side of the second substrate facing the liquid crystal layer, an electric field generated between the surface-shaped electrode and the strip-shaped electrode being capable of controlling deflections of liquid crystal molecules in the liquid crystal layer, wherein the surface-shaped electrode is configured as a continuous integral electrode layer.

13. The self-capacitance touch liquid crystal 3D display panel according to claim 12, wherein the first base substrate further includes connecting lines connected with the plurality of sensing electrodes, the connecting lines being arranged in a conductive layer, and being used for transmitting driving signals and detection signals to the plurality of sensing electrodes.

14. The self-capacitance touch liquid crystal 3D display panel according to claim 13, wherein the connecting lines are made from indium tin oxide, indium zinc oxide or a nano-silver material.

15. The self-capacitance touch liquid crystal 3D display panel according to claim 13, wherein the connecting lines are connected with the plurality of sensing electrodes through via holes.

16. The self-capacitance touch liquid crystal 3D display panel according to claim 13, wherein the connecting lines are arranged in one conductive layer.

17. The self-capacitance touch liquid crystal 3D display panel according to claim 13, wherein the connecting lines are arranged in two different conductive layers that are respectively located at both sides of the sensing electrode layer.

18. The self-capacitance touch liquid crystal 3D display panel according to claim 13, wherein the connecting lines are arranged between the plurality of strip-shaped electrodes and the sensing electrode layer.

19. The self-capacitance touch liquid crystal 3D display panel according to claim 12, wherein the sensing electrode layer is arranged between the plurality of strip-shaped electrodes and the first substrate.

20. A self-capacitance touch liquid crystal 3D display device, including the self-capacitance touch liquid crystal 3D display panel of claim 12.

* * * * *